(12) United States Patent
Xu et al.

(10) Patent No.: US 8,976,823 B2
(45) Date of Patent: Mar. 10, 2015

(54) CONTROLLABLE MULTI-WAVELENGTH LASER SOURCE (75) Inventors: Jingzhou Xu, Ann Arbor, MI (US); Gyu Cho, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 99 days.

(21) Appl. No.: 13/611,646

(22) Filed: Sep. 12, 2012

(65) Prior Publication Data

US 2013/0064256 A1    Mar. 14, 2013

Related U.S. Application Data (63) Continuation of application No. PCT/US2012/053899, filed on Sep. 6, 2012.

(60) Provisional application No. 61/534,669, filed on Sep. 14, 2011.

(51) Int. Cl.
*H01S 3/10* (2006.01)
*H01S 3/00* (2006.01)
*G02F 1/35* (2006.01)
*H01S 3/067* (2006.01)

(52) U.S. Cl.
CPC .......... *H01S 3/10061* (2013.01); *H01S 3/0092* (2013.01); *G02F 1/3544* (2013.01); *H01S 3/06712* (2013.01); *H01S 3/06754* (2013.01); *G02F 2001/3546* (2013.01)
USPC ................ 372/27; 372/26; 372/21; 372/22; 372/6

(58) Field of Classification Search
USPC ...................... 372/27, 26, 21, 22, 6
See application file for complete search history.

(56) References Cited

U.S. PATENT DOCUMENTS

| | | | |
|---|---|---|---|
| 4,962,993 A | | 10/1990 | Okamoto |
| 5,099,147 A | * | 3/1992 | Gregor et al. ............. 359/327 |
| 5,361,268 A | * | 11/1994 | Fossey et al. .............. 372/23 |
| 5,450,427 A | | 9/1995 | Fermann |
| 5,778,016 A | | 7/1998 | Sucha |
| 5,811,751 A | * | 9/1998 | Leong et al. .............. 219/121.6 |
| 5,818,630 A | | 10/1998 | Fermann |
| 5,847,863 A | | 12/1998 | Galvanauskas |
| 5,862,287 A | | 1/1999 | Stock |
| 5,880,877 A | * | 3/1999 | Fermann et al. ......... 359/341.31 |

(Continued)

FOREIGN PATENT DOCUMENTS

| | | |
|---|---|---|
| JP | 06076335 A | 3/1994 |
| JP | 2003290963 A | 10/2003 |

OTHER PUBLICATIONS

International Search Report, PCT/US12/53899, Dec. 4, 2012.

(Continued)

*Primary Examiner* — Kinam Park
(74) *Attorney, Agent, or Firm* — Sughrue Mion, PLLC; Richard C. Turner (57) ABSTRACT In at least one embodiment a laser system includes a fiber laser source, a polarization controller and a wavelength converter. The relative power distribution between a pump wavelength and a signal wavelength is controllable using the polarization controller. An optional phase compensator is used to control polarization state of the output laser beam. In various embodiments the relative power distribution among multiple wavelengths may be controlled over a range of at least about 100:1.

34 Claims, 4 Drawing Sheets

(56) References Cited

U.S. PATENT DOCUMENTS

| | | |
|---|---|---|
| 6,154,310 A | 11/2000 | Galvanauskas |
| 6,181,463 B1 | 1/2001 | Galvanauskas |
| 6,198,568 B1 | 3/2001 | Galvanauskas |
| 6,208,458 B1 | 3/2001 | Galvanauskas |
| 6,334,011 B1 | 12/2001 | Galvanauskas |
| 6,549,547 B2 | 4/2003 | Galvanauskas |
| 6,744,555 B2 | 6/2004 | Galvanauskas |
| 6,885,683 B1 | 4/2005 | Fermann |
| 7,684,450 B2 | 3/2010 | Shah |
| 7,782,912 B2 * | 8/2010 | Harter et al. ............. 372/6 |
| 7,804,864 B2 * | 9/2010 | Gu et al. ............. 372/6 |
| 2003/0035201 A1 | 2/2003 | Budni |
| 2009/0201575 A1 | 8/2009 | Fermann |
| 2010/0025387 A1 | 2/2010 | Arai |

OTHER PUBLICATIONS

European Search Report, PCT/US2012053899, Aug. 21, 2014.

* cited by examiner

CONTROLLABLE MULTI-WAVELENGTH LASER SOURCE

This application is a continuation of PCT/US2012/053899 filed Sep. 6, 2012, and is also a non-provisional of U.S. Provisional Application No. 61/534,669 filed Sep. 14, 2011. The prior applications are incorporated herein by reference.

FIELD OF THE INVENTION

The invention relates to a fiber laser source with multiple output wavelengths and, more particularly, to methods and systems for controlling the energy at each wavelength.

BACKGROUND

Utilization of fiber laser sources has increased in industrial and scientific applications over the last few years in metrology, imaging and material processing applications. Fiber-based laser systems are now well established for numerous applications, and are particularly well suited for high repetition rate applications at low to medium pulse power.

Nonlinear optical processes and media may be used to convert a fundamental output wavelength of a fiber laser to another wavelength where a fiber laser source is not available. A wavelength converted signal may be generated by harmonic conversion, sum or difference frequency mixing, parametric amplification, Raman shifting, self-phase modulation (SPM) and/or other suitable non-linear processes.

Utilizing multiple wavelengths can be beneficial. For example, in terahertz applications, one wavelength is used to generate THz radiation and the other wavelength is used to detect THz pulses. Similarly, in time gating pump and probe measurements the first wavelength is used to excite the object and the second wavelength is used as probe. In some laser processing applications, the first wavelength can be used to pre-process a target material and the second wavelength used to further process the target.

The following patents, published patent applications, and publications relate, at least in part, to fiber lasers and amplifiers, optical measurement techniques, and/or various arrangements for generating groups of laser pulses: U.S. Pat. Nos. 5,450,427; 5,818,630; 5,880,877. In addition, U.S. Pat. No. 5,361,268 discloses a switchable two-wavelength frequency converting laser system.

Various techniques can be used to switch between a pump and signal wavelength. As one example, switching laser output between the pump wavelength and the signal wavelength can be done by shifting a nonlinear crystal in and out of the pump laser beam, or by steering the pump laser beam on and off the crystal. However, this provides either the pump or signal as a single output, without continuous or high resolution control of either pump or signal power. Also, it is difficult to maintain the critical alignment. As one alternative, tuning the phase matching of the nonlinear crystal by changing temperature, incident angle, etc., can change the power of the signal light. However, the adjusting range is usually limited and the tuning may affect the wavelength. As another example, multiple optical paths can be utilized with optical modulators/deflectors to selectively direct pump radiation to the non-linear crystal or to the output, but such an arrangement can increase system complexity.

The phase matching condition in the nonlinear crystal is usually sensitive to polarization states of the input and output laser beams. For example, when a (ooe) type I phase matching is used, only the pump light, whose polarization is parallel to the ordinary axis of the nonlinear crystal, contributes to the useful nonlinear process. Therefore, the signal power can be controlled by changing polarization states of the pump source.

A nonlinear crystal allowing phase matching is usually a birefringent crystal. As a result, the polarization state of transmission light will be changed unless the initial polarization is parallel to an optical axis of the crystal. Under such conditions the output laser polarization may become elliptically polarized. The undefined elliptical polarization state may not be desirable for some applications where polarization is critical.

Wave plates, such as quarter wave plates and/or half wave plates may be used to correct the phase delay. However, simply adding wave plates into the beam path may not completely compensate the phase delay generated by the nonlinear crystal. The polarization states may vary whenever the energy distribution is changed, which requires an adjustment of the wave plates. Additionally, wave plates will affect polarization states of both pump and signal wavelengths if they are not spatially separated in advance. Separating the pump and signal light, as well as adjusting the wave plates, increases complexity of the laser system and its operation.

SUMMARY OF THE INVENTION

It is one object the present invention to provide a simple and robust multi wavelength fiber laser source where the energy/power distribution among multiple wavelengths is adjustable. For example, controlling the distribution of energy between pump and signal wavelengths can be advantageous for THz generation, material processing, pump and probe measurements and other applications.

In one aspect, the present invention features a wavelength converting unit having a nonlinear crystal, and a polarization controller disposed before the crystal. The laser power distribution is controllable between the pump and the signal wavelengths with the polarization controller, for example by adjusting a polarization controlling component. The wavelength converting unit can be combined with switchable optical filters downstream to select an output wavelength.

In another aspect of the present invention, a phase compensator is disposed after the nonlinear crystal to control the polarization state of the output.

At least one embodiment includes a laser system, comprising: a fiber laser source which generates an input beam having a first wavelength; a polarization controller to control a polarization of the input beam; and a wavelength converter which receives the input beam from the polarization controller and generates a wavelength converted beam. At least a portion of beam power at the first wavelength is converted into beam power at a second wavelength. The polarization controller is arranged in such a way that the relative power at each of the first and second wavelengths is controllable, and the laser system output comprises detectable power at both the first and second wavelengths.

In some embodiments a spectral selective filter is included to select either the first wavelength or second wavelength.

At least one embodiment includes a laser system, comprising: a fiber laser source which generates an input beam having a first wavelength. The source includes a fiber-based laser and/or amplifier, and a polarization maintaining fiber. A polarization controller is arranged in such a way as to control a polarization of an input beam received from the laser source, and to output a first beam having a desired polarization. The polarization controller is capable of polarization adjustment over a substantially continuous range from full available power to near extinction. The system includes a wavelength converter which receives the first beam from the polarization controller and generates a wavelength converted beam in which at least a portion of beam power at the first wavelength is converted into beam power at a second wavelength. The polarization controller is arranged in such a way that the relative power at each of the first and second wavelengths is controlled by the polarization controller, and the laser system output comprises detectable power at both the first and second wavelengths.

DETAILED DESCRIPTION

As referred to herein the term "wavelength" generally refers to a central wavelength about which a pre-determined, defined, or nominal spectral bandwidth exists, and such bandwidth may correspond to a narrow, quasi-monochromatic range of wavelengths (e.g.: a fraction of 1 nm) or a broader spectral bandwidth (e.g.: greater than 1 nm). By way of example, a spectral bandwidth may be a function of a laser pulse width, and may be broadened as a result of the non-linear wavelength-conversion processes.

As referred to herein, signal power may be considered detectable when sufficiently above a noise or polarization extinction level to allow for reliable processing or measurement. Such criteria, for example, may be characterized by a signal to noise ratio of at least about 3:1, and more preferably about 10:1.

A fundamental wavelength output from a laser source may be referred to as a "pump" and a wavelength converted output as "signal", such terminology being in the context of laser based "pump-probe" applications.

As referred to herein a distribution of energy (or power) may be characterized by relative signal power and/or energy among multiple wavelengths, for example the ratio of pulse power at two wavelengths.

A "laser beam" refers to continuous, quasi-continuous, and/or pulsed energy or power within a laser-based system.

A "pulsed laser beam" refers to one or a series of laser pulses which may be characterized by pulse parameters: e.g.: pulse duration, and repetition rate, or a duty cycle. A "pulsed laser beam" may comprise pulse train(s) or bursts of short laser pulses. The parameters of the pulsed laser beam may be varied.

"Quasi-CW" refers to laser outputs having relatively long pulse width, e.g.: 10 μs.

A "CW laser" refer to a laser that emits radiation continuously, or nearly so, and may be characterized by a very high duty cycle during normal operation.

Laser source characteristics may be combined, and are not mutually exclusive. For example it is known that a "CW mode locked laser" emits a mode locked pulse train in continuous operation (e.g.: see photonics.com/continuous_wave_operation.html for a description of mode locked lasers.)

Figure 1A:
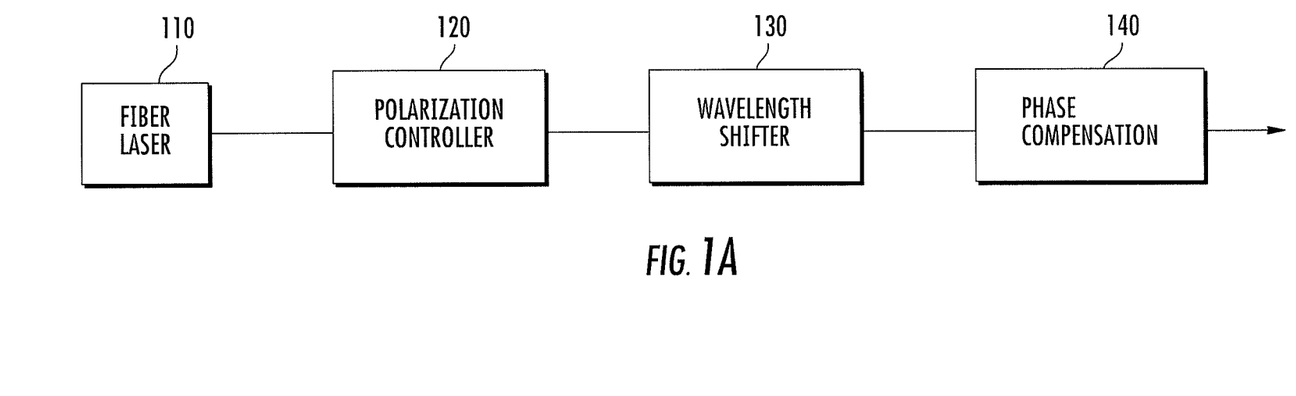
FIG. 1A schematically illustrates an example of controllable wavelength fiber-based source in accordance with the present invention.

At least one embodiment of the present invention, for example as shown in FIG. 1A, includes a fiber-based laser source 110 to generate an input laser beam having a first wavelength, a polarization controller 120 having one or more polarization controlling components that receives the input beam, a wavelength converter 130 (e.g.: a wavelength conversion unit) which may include a quasi phase matching (QPM) nonlinear crystal, and an optional phase compensator 140. The QPM non-linear crystal may comprise periodically poled lithium niobate (PPLN).

The fiber-based source 110 is preferred, although other suitable laser sources may be utilized. The laser source may comprise one or a combination of a pulsed laser, CW laser, and/or a quasi-CW laser. For example, the laser source may comprise a gain switched, q-switched, and/or mode locked source, including a CW or Q-switched mode locked laser. In a preferred embodiment the source output is linearly polarized.

A fiber laser or laser amplifier having a predetermined output polarization state is desirable. For example, polarization maintaining (PM) fiber can be used in the fiber laser 110 to maintain the polarization of an output therefrom. Rare earth doped fiber is the desirable gain media in the fiber laser or fiber laser amplifier.

Figure 1B:
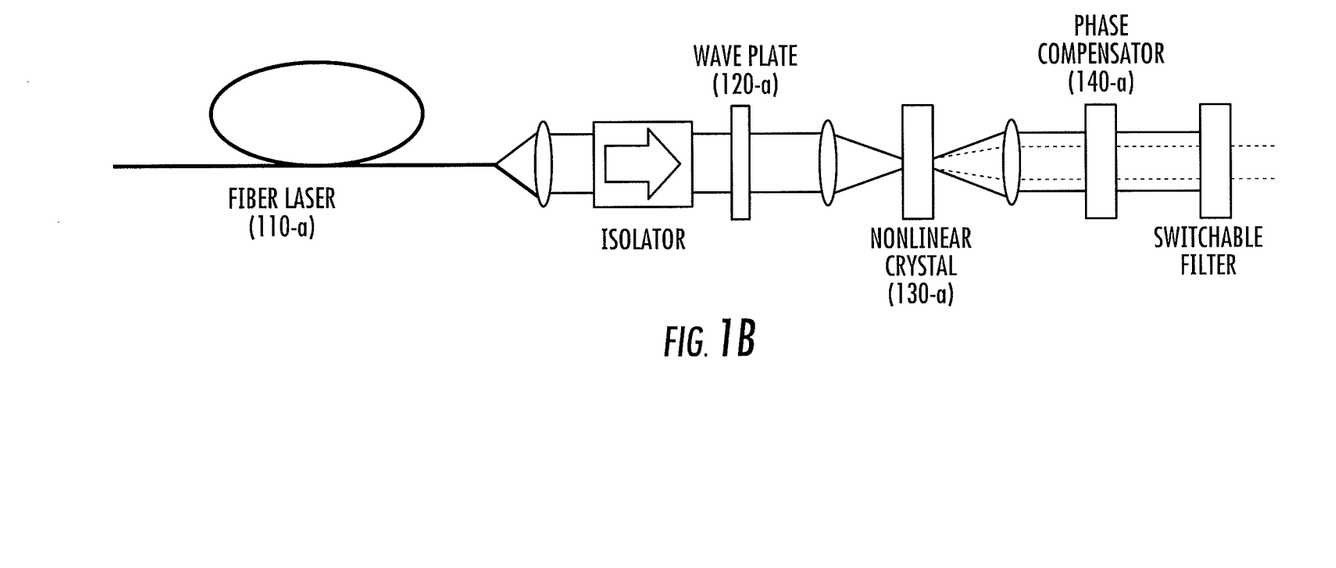
FIG. 1B illustrates an exemplary arrangement corresponding with an embodiment of the present invention.

The wavelength converter 130 is sensitive to polarization state at its input (e.g.: pump polarization). For example, when a PPLN crystal is used in the converter and the polarization of the pump light is parallel to polarization of the crystal, the phase matching condition is satisfied. Thus, by using polarization controller 120 to control the polarization state at the input of the wavelength converter 130, one can control the conversion efficiency of the QPM crystal or other conversion element. Thus, the wavelength dependent signal power at the output of the wavelength converter 130 can be varied from maximum available output to near extinction. FIG. 1B illustrates an exemplary preferred system, including a non-linear crystal 130a for wavelength conversion, a phase compensator 140-a, and switchable filters for wavelength selection. In this example the polarization controller comprises a half wave plate 120-a and an optical isolator is utilized to limit back reflection. In various embodiments commercially available half wave plates may be utilized. Because a wave plate can be specified with low wedge, the wave plate can be rotated and proper alignment of the optical system can easily be maintained. Operation of the optional phase compensator 140-a will be discussed below.

Figure 2:
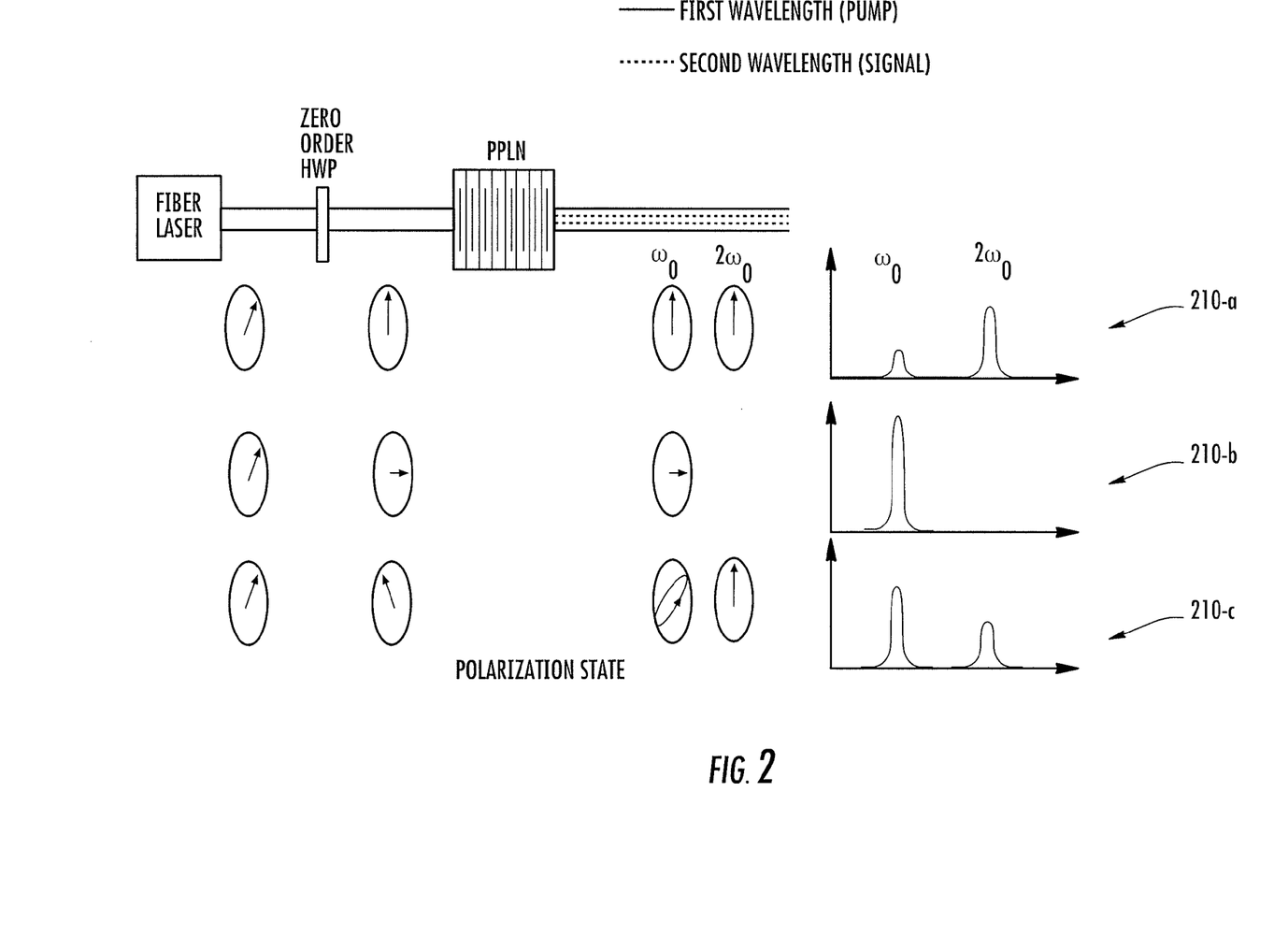
FIG. 2 schematically illustrates an example in which the power distribution between pump and signal wavelengths is controlled with a polarization controller.

FIG. 2 illustrates control of the power (or energy) distribution between pump and signal wavelengths with a polarization controller (e.g.: a zero order half wave plate), with a PPLN crystal for frequency doubling. With linearly polarized pump light, the half wave plate can change the polarization to any desired angle. The electric field lying on the phase matching polarization is $A_\theta = A_0 \cos(\theta)$, where $\theta$ is the angle between the pump light polarization and the phase matching polarization. Thus, in principle, the field of the pump light parallel to the phase matching polarization direction can be controlled to any value between 0 to $A_0$. The relative beam power at the respective first (e.g.: pump) and second (e.g.: signal) wavelengths is thereby controlled, as schematically illustrated in plots 210-a, 210-b, and 210-c in FIG. 2, which schematically represent wavelength spectra of the respective first and second (e.g.: wavelength converted) beams.

Figure 3:
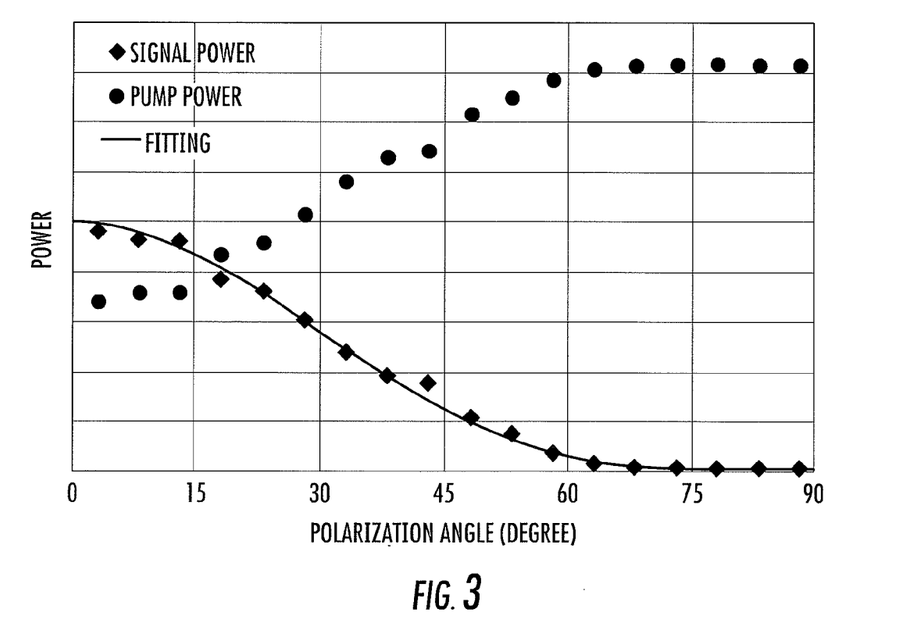
FIG. 3 is a plot illustrating measurements of pump and signal output obtained by controlling the signal power using a polarization controller, and conformance of signal power with angular dependence of SHG generation FIGS. 4A and 4B schematically illustrate examples in which the polarization state of the pump light is controlled using a phase compensator.

FIG. 3 illustrates measurements obtained with a system according to FIG. 2. In this example an erbium based fiber femtosecond laser oscillator and amplifier were used as the fiber-based laser source. The output of laser amplifier provided laser pulse trains in which pulses had a central wavelength at 1610 nm, a pulse duration of about 100 fs, a pulse energy of about 3 nJ, and linear polarization. A PPLN crystal was used for wavelength conversion. A zero order half wave plate was placed between the fiber laser amplifier and the PPLN crystal. The relative power of the pump pulses and the corresponding signal pulses was measured.

The plot of FIG. 3 shows variation of the signal power and pump power with pump light polarization. The signal power was directly measured and pump power was calculated based on signal power. The signal power conformed to known angular dependence of SHG generation, as shown by the fit in FIG. 3. The result demonstrates smooth dependence of the signal power over a control range of at least about 100:1. In various embodiments the control range may exceed 10:1; a range approaching 1000:1 is achievable, limited by the extinction ratio and polarization purity of system components. The pump power is also smoothly controllable over the range, and the modulation of pump power is determined by the maximum conversion efficiency.

In various embodiments electronic control is desirable, for example via computer remote control (not shown). For example, a control function may be generated, sampled or otherwise established at several polarization settings, stored as digital data, and reconstructed for substantially continuous control over the control range, thereby allowing for flexible, high resolution, and high speed control. An electronically controllable phase retardation device, such as a liquid crystal phase modulator or an electro-optical modulator can be used in such implementations. In various embodiments a polarization controlling unit other than a phase retarder could be used, for example a Faraday rotator whose magnetic field is adjustable.

In some embodiments a power monitoring and a feedback system (not shown) can be used to automatically control the power distribution to the desired value, and may be further configured as an output stabilizer. By way of example, in various embodiments the relative power distribution among multiple wavelengths may be controlled over a range of at least about 100:1.

Referring back to FIGS. 1A and 1B, the optional phase compensator 140 may be utilized in various implementations to further control polarization purity. Birefringence of a non-linear crystal can be a consideration, resulting in phase delay between polarization states light passing through the crystal. A phase delay may change the polarization of the light to a different state from the input, for example as presented in FIG. 2, at 210-c. The phase delay may be compensated using conventional phase retardation components, such as combining of quarter wave plates and half wave plates (not shown), although such compensation adds to system complexity. The variation of power ratio between two different polarization states makes the output beam polarization state vary accordingly. Thus, although suitable for use in some embodiments, compensating the phase delay using the conventional phase retarding components is somewhat inconvenient.

Figure 4A:
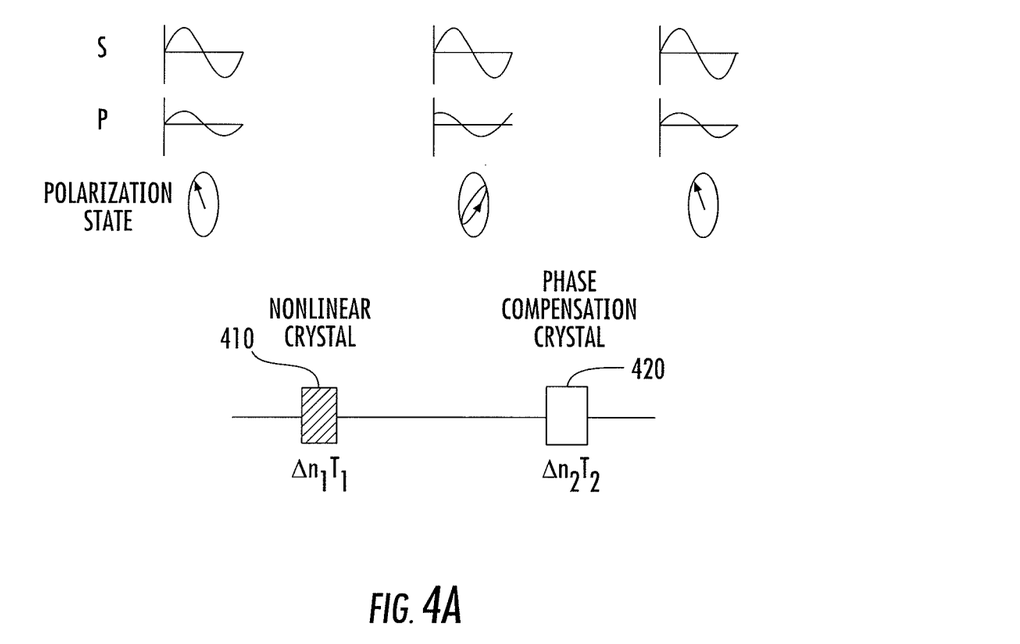
Figure 4B:
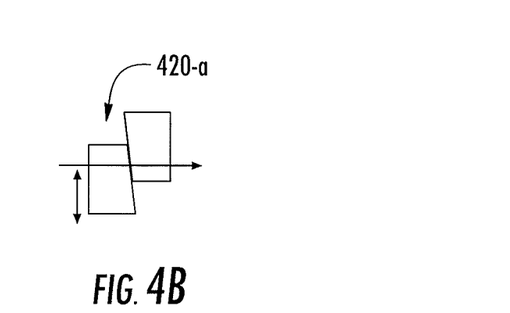

Although the power distribution between the two polarization states of the pump light varies, the phase delay between these two axes remains constant. This feature allows a fixed phase compensator to be utilized so as to compensate the phase delay as illustrated in FIG. 4. A birefringent optical component can be used for this purpose, and most preferably will have a sufficiently high non-linear threshold, or otherwise be configured, to avoid wavelength shifting. The non-linear crystal 410 and phase compensation crystal 420 are characterized, in part, by their respective thickness, and the respective index difference seen along the S and P directions. The phase compensator will preferably have the same optical axis, or parallel optical axis of opposite sign, relative to that of the nonlinear crystal. The thickness of the compensator 420 will be preset to give the same value of phase delay while being opposite in sign to the optical axis of the nonlinear crystal. The compensator can recover the polarization state to the incident state. Recovery is not affected by power ratio variation, and it will not affect the signal light because the polarization of the signal light is parallel to the optical axis of the nonlinear crystal and the compensator. Thus, separation of pump and signal light is not necessary.

As illustrated in FIG. 4, the phase compensator could be an optic with preselected thickness, or it can be formed by two pieces with prism shape 420-a as shown in FIG. 4B. The latter arrangement allows pre-adjusting the thickness of the compensator to match the delay caused by the nonlinear crystal. In some embodiments an active device may be utilized, such as an EO component. With the compensator implementations in FIG. 4 the phase delay need not be adjusted after the laser system is aligned. However, in some arrangements adjustment mechanisms may be provided, and may be preferred to achieve additional benefits, such as manipulating the polarization state of the laser system output.

Referring back to FIG. 2, a wavelength selective filter can be placed downstream from the wavelength converter, which can selectively allow either the pump light or the signal light, or both, to be output from the laser source. If only one of the pump and signal are to be output, the polarization controlling component and the wavelength converter can be used as a power adjuster and/or power stabilizer.

In the above examples the pump and signal were arranged for operation in a two-wavelength system. However, embodiments of the present invention are not restricted to only two wavelength operation. As stated above, several non-linear processes are available for wavelength conversion, and embodiments utilizing such processes are within the scope of the present invention. The polarization control and phase compensation techniques may be adapted for use with more than two output wavelengths. For example, if an idler wavelength differs from either the pump wavelength or the signal wavelength, and is generated in the wavelength converter, the dual wavelength laser system can be arranged as a triple wavelength light source. Numerous options may be utilized to provide a multi-wavelength pulsed laser source. For example, although fiber-based laser technology is preferred, in some embodiments a DPSS Q-switched laser may be utilized to generate input pulses, and may optionally be combined with a fiber laser and/or amplifier. In various implementations a CW or quasi-CW source may be utilized, including fiber lasers and/or long pulse diode sources. As discussed above, wavelength shifting is not restricted to harmonic generation, and may be carried out with other suitable non-linear processes. In some embodiments nonlinear crystals, such as QPM crystals (e.g.: PPLN) or non-critical phase matched crystals (e.g.: LBO) may be utilized, and such crystals may exhibit a wavelength dependent response to temperature. By tuning the temperature of such crystal, further control of the output wavelength and power conversion efficiency may be achieved. In some embodiments non-polarized inputs may be generated and converted to polarized beams with suitable optics. In some implementations a polarization controller may be adjusted during laser system fabrication to provide a preset polarization and output wavelengths for operation, without field adjustment. In some implementations a control unit may be provided for flexible operation over a desirable control range.

Thus, the invention has been described in several embodiments. It is to be understood that the embodiments are not mutually exclusive, and elements described in connection with one embodiment may be combined with, or eliminated from, other embodiments in suitable ways to accomplish desired design objectives.

At least one embodiment includes a laser system. The laser system includes a laser source which generates an input beam having a first wavelength. A polarization controller controls a polarization of the input beam. A wavelength converter receives the input beam from the polarization controller at a first wavelength and generates a wavelength converted beam in which at least a portion of beam power at the first wavelength is converted into beam power at a second wavelength. The polarization controller is arranged in such a way that the relative power at each of the first and second wavelengths is controllable, and the laser system output includes signal power at both the first and second wavelengths.

In any or all embodiments the laser source may include rare earth doped optical fiber.

In any or all embodiments the laser source may include polarization maintaining fiber.

In any or all embodiments the laser source may include a pulsed laser that generates a pulsed laser beam having at least one pulse width in the femtosecond to picosecond range, wherein the relative power of corresponding input and wavelength converted pulses at respective first and second wavelengths is controllable with the polarization controller.

In any or all embodiments the polarization controller may include a phase retarder.

In any or all embodiments the polarization controller may include an electro-optic modulator.

In any or all embodiments the polarization controller may include a liquid crystal phase retarder.

In any or all embodiments the polarization controller may include a controllable Faraday rotator.

In any or all embodiments a phase compensator may be disposed downstream from the wavelength converter, and arranged to control a polarization state at one or more wavelengths.

In any or all embodiments the phase compensator may include birefringent optics.

In any or all embodiments the birefringent optics may include a polarization maintaining fiber.

In any or all embodiments the birefringent optics may include two elements having a prism shape.

In any or all embodiments the birefringent optics may include an active phase retarder.

In any or all embodiments the active phase retarder may include an electro-optical phase modulator.

In any or all embodiments one or more wavelength selective filters may be disposed downstream from the wavelength converter to control the output energy fraction of the first and second wavelengths.

In any or all embodiments the pulsed laser source may include a fiber laser and/or amplifier.

In any or all embodiments a feedback controller may stabilize the output laser power.

In any or all embodiments the first wavelength may be a pump wavelength, the second wavelength may be a signal wavelength, and the laser system configured as a portion of a system for time gating pump and probe measurements, wherein energy at the first wavelength is used to excite an object and energy at the second wavelength is used as a probe.

In any or all embodiments the laser system may be configured as a portion of a material processing system in which energy at the first wavelength is used to pre-process a target material and energy at the second wavelength is used to further process the target material.

In any or all embodiments the relative power may be controllable over a control range of at least about 10:1.

In any or all embodiments the laser source may include both a fiber laser and fiber amplifier.

In any or all embodiments the wavelength converter may include a quasi-phase matched or a non-critical phase matched non-linear crystal, said non-linear crystal characterized by having a wavelength dependent response to temperature.

In any or all embodiments the quasi-phase matched crystal may include periodically poled lithium niobate (PPLN).

In any or all embodiments the non-critical phase matched crystal may include lithium triborate (LBO).

At least one embodiment includes a laser system. The laser system includes a laser source which generates an input beam having a first wavelength. A polarization controller controls a polarization of the input beam. A wavelength converter receives the input beam from the polarization controller and generates a wavelength converted beam in which at least a portion of beam power at the first wavelength is converted into beam power at a second wavelength. The polarization controller is arranged in such a way that the relative power at each of the first and second wavelengths is controllable. The laser system output includes signal power at both the first and second wavelengths. A spectral selective filter is included to select either the first wavelength or the second wavelength.

In any or all embodiments the first wavelength may be a pump wavelength, the second wavelength may be a signal wavelength, and the laser system configured as a portion of a system for time gating pump and probe measurements, wherein energy at the first wavelength is used to excite an object and energy at the second wavelength is used as a probe.

In any or all embodiments the laser system may be configured as a portion of a material processing system in which energy at the first wavelength is used to pre-process a target material and energy at the second wavelength is used to further process the target material.

In any or all embodiments the power distribution between the wavelengths may be controllable over a range of at least about 10:1.

At least one embodiment includes a laser system. The laser system includes a fiber-based laser source which generates an input beam having a first wavelength. The fiber-based source includes a fiber-based laser and/or amplifier. A polarization controller is arranged in such a way as to control a polarization of an input beam received from the laser source, and to output a first beam having a first wavelength and a desired polarization. The polarization controller is capable of polarization adjustment over a substantially continuous range from full available power to near extinction. A wavelength converter receives the first beam from the polarization controller and generates a wavelength converted beam in which at least a portion of beam power at the first wavelength is converted into beam power at a second wavelength. The polarization controller is arranged in such a way that the relative power at each of the first and second wavelengths is controlled by the polarization controller. The laser system output includes signal power at both the first and second wavelengths.

In any or all embodiments a phase compensator may be disposed downstream from the wavelength shifter to control a beam polarization at one or more wavelengths.

In any or all embodiments the fiber-based laser source may include polarization maintaining fiber.

In any or all embodiments the polarization controller may provide a preset polarization of the input beam such that the relative output power detectable at the first and second wavelengths is substantially constant.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

While only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein

What is claimed is:

1. A laser system, comprising:
    a laser source which generates an input beam having a first wavelength;
    a polarization controller to control a polarization of the input beam, said polarization controller comprising a phase retarder comprising a wave plate; and
    a wavelength converter which receives the input beam from the polarization controller at a first wavelength and generates a wavelength converted beam in which at least a portion of beam power at the first wavelength is converted into beam power at a second wavelength, wherein the wavelength converter comprises a birefringent non-linear crystal, wherein the wavelength conversion efficiency is determined by phase matching, said phase matching comprising quasi-phase matching, non-critical phase matching, or critical phase matching,
    wherein the polarization controller is arranged in such a way that the relative power at each of the first and second wavelengths is controllable, and the laser system output comprises signal power at both the first and second wavelengths, and wherein a wavelength dependent signal power at the output of the wavelength converter can be varied from full available power output to near extinction.

2. The laser system in claim 1, wherein the laser source comprises rare earth doped optical fiber.

3. The laser system in claim 1, wherein the laser source comprises polarization maintaining fiber.

4. The laser system in claim 1, wherein the laser source comprises a pulsed laser that generates a pulsed laser beam having at least one pulse width in the femtosecond to picosecond range, wherein the relative power of corresponding input and wavelength converted pulses at respective first and second wavelengths is controllable with the polarization controller.

5. The laser system of claim 1, wherein the polarization controller comprises a liquid crystal phase retarder.

6. The laser system of claim 1, the polarization controller comprises a controllable Faraday rotator.

7. The laser system of claim 1, wherein a phase compensator is disposed downstream from the wavelength converter, and is arranged to control a polarization state at one or more wavelengths.

8. The laser system of claim 7, wherein the phase compensator comprises birefringent optics.

9. The laser system of claim 8, wherein the birefringent optics comprise a polarization maintaining fiber.

10. The laser system of claim 8, wherein the birefringent optics comprise two elements having a prism shape.

11. The laser system of claim 8, wherein the birefringent optics comprise an active phase retarder.

12. The laser system of claim 11, wherein the active phase retarder comprises an electro-optical phase modulator.

13. The laser system of claim 1, wherein one or more wavelength selective filters are disposed downstream from the wavelength converter to control the output energy fraction of the first and second wavelengths.

14. The laser system of claim 1, wherein the pulsed laser source comprises a fiber laser and/or amplifier.

15. The laser system of claim 1, further comprising a feedback controller to stabilize the output laser power.

16. The laser system of claim 1, wherein the first wavelength is a pump wavelength, the second wavelength is a signal wavelength, and the laser system is configured as a portion of a system for time gating pump and probe measurements, wherein energy at the first wavelength is used to excite an object and energy at the second wavelength is used as a probe.

17. The laser system of claim 1, wherein the laser system is configured as a portion of a material processing system in which energy at the first wavelength is used to pre-process a target material and energy at the second wavelength is used to further process the target material.

18. The laser system of claim 1, wherein the relative power is controllable over a control range of at least about 10:1.

19. The laser system of claim 1, wherein the laser source comprises both a fiber laser and fiber amplifier.

20. The laser system of claim 1, wherein said non-linear crystal comprises periodically poled lithium niobate (PPLN).

21. The laser system of claim 1, wherein said non-linear crystal comprises lithium triborate (LBO).

22. A laser system comprising:
    a fiber-based laser source which generates an input beam having a first wavelength, the source comprising a fiber-based laser and/or amplifier;
    a polarization controller arranged in such a way as to control a polarization of an input beam received from the laser source, and to output a first beam having a first wavelength and a desired polarization, said polarization controller being capable of polarization adjustment over a substantially continuous range from full available power to near extinction, said polarization controller comprising a phase-retarder, comprising a wave plate; and
    a wavelength converter which receives the first beam from the polarization controller and generates a wavelength converted beam in which at least a portion of beam power at the first wavelength is converted into beam power at a second wavelength, wherein the wavelength converter comprises a birefringent nonlinear crystal, where the wavelength conversion efficiency is determined by phase matching, said phase matching comprising quasi-phase matching , non-critical phase matching, or critical phase matching,
    wherein the polarization controller is arranged in such a way that the relative power at each of the first and second wavelengths is controlled by the polarization controller, and the laser system output comprises signal power at both the first and second wavelengths.

23. The laser system of claim 22, further comprising a phase compensator disposed downstream from the wavelength converter to control a beam polarization at one or more wavelengths.

24. The laser system of claim 22, wherein the fiber-based laser source comprises a polarization maintaining fiber.

25. The laser system of claim 22, wherein the polarization controller provides a preset polarization of the input beam such that the relative output power detectable at the first and second wavelengths is substantially constant.

26. The laser system of claim 22, further comprising: a spectral selective filter to select either the first wavelength or the second wavelength.

27. The laser system of claim 22, wherein non-linear crystal comprises periodically poled lithium niobate (PPLN).

28. The laser system of claim 22, wherein said non-linear crystal comprises lithium triborate (LBO).

29. The laser system of claim 22, wherein the laser source comprises both a fiber laser and fiber amplifier.

30. The laser system in claim 22, wherein the fiber-based laser source comprises a pulsed laser that generates a pulsed laser beam having at least one pulse width in the femtosecond to picosecond range, wherein the relative power of corresponding input and wavelength converted pulses at respective first and second wavelengths is controllable with the polarization controller.

31. The laser system of claim 22, wherein one or more wavelength selective filters are disposed downstream from the wavelength converter to control the output energy fraction of the first and second wavelengths.

32. The laser system of claim 22, wherein the phase compensator comprises birefringent optics.

33. A laser system, comprising:
a laser source which generates an input beam having a first wavelength;
a polarization controller to control a polarization of the input beam;
a wavelength converter which receives the input beam from the polarization controller and generates a wavelength converted beam in which at least a portion of beam power at the first wavelength is converted into beam power at a second wavelength, wherein the polarization controller is arranged in such a way that the relative power at each of the first and second wavelengths is controllable, and the laser system output comprises signal power at both the first and second wavelengths; and
a phase compensator to compensate phase retardation at one or both wavelength(s) generated in the wavelength converter.

34. The laser system of claim 33, comprising a spectral selective filter to select either a first wavelength or the second wavelength.

* * * * *